US010139858B2

(12) United States Patent
Andrew et al.

(10) Patent No.: US 10,139,858 B2
(45) Date of Patent: Nov. 27, 2018

(54) APPARATUS WITH ELASTICALLY TRANSFORMABLE BODY

(75) Inventors: Piers Andrew, Cambridge (GB); Teppo Tapani Jokinen, Espoo (FI); Lotta Maaria Partanen, Helsinki (FI); Antti Salo, Lohja (FI); Jarkko Tapio Saunamäki, Vantaa (FI); Qifeng Yan, Espoo (FI); Matti Kosonen, Järvenpää (FI)

(73) Assignee: Nokia Technologies Oy, Espoo (FI)

( * ) Notice: Subject to any disclaimer, the term of this patent is extended or adjusted under 35 U.S.C. 154(b) by 890 days.

(21) Appl. No.: 12/891,364

(22) Filed: Sep. 27, 2010

(65) Prior Publication Data

US 2012/0078999 A1 Mar. 29, 2012

(51) Int. Cl.
*H04B 1/38* (2015.01)
*G06F 1/16* (2006.01)
*G06F 3/01* (2006.01)

(52) U.S. Cl.
CPC .............. *G06F 1/163* (2013.01); *G06F 3/014* (2013.01)

(58) Field of Classification Search
CPC ....... G06F 1/1652; G06F 1/163; H04B 1/385; H04M 1/0268; G09F 9/301
See application file for complete search history.

(56) References Cited

U.S. PATENT DOCUMENTS

| 5,224,076 A | 6/1993 | Thorp |
| 6,192,253 B1 | 2/2001 | Charlier et al. |
| 2003/0026170 A1 | 2/2003 | Yang |
| 2003/0076343 A1 * | 4/2003 | Fishkin ............... G06F 1/16 715/701 |
| 2003/0197678 A1 | 10/2003 | Siddeeq |
| 2006/0050475 A1 * | 3/2006 | Chen .................... 361/683 |
| 2006/0113960 A1 * | 6/2006 | Thulesius ........... G06F 1/3203 320/133 |
| 2006/0169989 A1 * | 8/2006 | Bhattacharya ...... H01L 51/0021 257/79 |
| 2007/0106457 A1 * | 5/2007 | Rosenberg ............... 701/200 |

(Continued)

FOREIGN PATENT DOCUMENTS

| CN | 201230333 | 4/2009 |
| EP | 1835704 | 9/2007 |

(Continued)

OTHER PUBLICATIONS

International Search Report of International Application No. PCT/FI2011/050555—Date of Completion of Search: Oct. 17, 2011, 4 pages.

(Continued)

*Primary Examiner* — Zhiyu Lu
(74) *Attorney, Agent, or Firm* — Locke Lord LLP

(57) ABSTRACT

An apparatus comprises a transformable body configured to be elastically stretchable between at least a first configuration and a second configuration, a user input device, a user input device configured to receive user input signal, a communication interface configured to provide a wireless link for the apparatus and a flexible interconnection between at least two components within the transformable body. The apparatus may perform determining of user information based on the user input signal, transmitting at least part of the user information over the wireless link to a remote processing unit, receiving feedback information from the remote processing unit and presenting the feedback information to the user.

41 Claims, 5 Drawing Sheets

(56) References Cited

U.S. PATENT DOCUMENTS

| | | | |
|---|---|---|---|
| 2008/0063456 A1* | 3/2008 | Lahr | 400/491 |
| 2008/0114538 A1* | 5/2008 | Lindroos | 701/208 |
| 2008/0132299 A1* | 6/2008 | Bostaph | G06F 1/1615 455/575.1 |
| 2008/0291225 A1* | 11/2008 | Arneson | G06F 3/011 345/698 |
| 2009/0153542 A1* | 6/2009 | Arneson et al. | 345/214 |
| 2009/0163241 A1* | 6/2009 | Vossoughi | H04M 1/0254 455/556.1 |
| 2009/0280861 A1 | 11/2009 | Khan | |
| 2010/0164888 A1* | 7/2010 | Okumura | G06F 1/1626 345/173 |
| 2010/0317409 A1* | 12/2010 | Jiang et al. | 455/566 |
| 2011/0043496 A1* | 2/2011 | Ray Avalani | 345/204 |
| 2013/0044215 A1* | 2/2013 | Rothkopf | G06F 1/163 348/143 |

FOREIGN PATENT DOCUMENTS

| | | |
|---|---|---|
| WO | WO2004114107 | 12/2004 |
| WO | WO2008140780 | 11/2008 |
| WO | WO2009065436 | 5/2009 |
| WO | WO2010036402 | 4/2010 |
| WO | WO2010040061 | 4/2010 |

OTHER PUBLICATIONS

Written Opinion of the International Searching Authority of International Application No. PCT/FI2011/050555—Date of Completion of Opinion: Oct. 17, 2011, 7 pages.
Chinese Office Action dated Aug. 28, 2014 for CN Application No. 201180046304.6.
Extended European Search Report for Application No. 11828186.4-1972/2622828 dated Feb. 15, 2017.

* cited by examiner

APPARATUS WITH ELASTICALLY TRANSFORMABLE BODY

TECHNICAL FIELD

The present invention generally relates to apparatuses having transformable body configured to be elastically stretchable between at least a first configuration and a second configuration.

BACKGROUND ART

In electronic devices, such as mobile handheld devices, the user from time to time might need different operation modes for the electronic device. Different kinds of hinge and slide solutions are known to provide different operation modes.

SUMMARY

According to a first example aspect of the invention there is provided an apparatus comprising:
a transformable body configured to be elastically stretchable between at least a first configuration and a second configuration;
a user output device;
a user input device configured to receive user input signal;
a communication interface configured to provide a wireless link for the apparatus;
a flexible interconnection between at least two components within the transformable body;
at least one processor; and
at least one memory including computer program code, the at least one memory and the computer program code being configured to, with the at least one processor, cause the apparatus at least to perform:
determine user information based on the user input signal;
transmit at least part of the user information over the wireless link to a remote processing unit;
receive feedback information from the remote processing unit; and
present the feedback information to the user utilizing the user output device.

In an example embodiment, the apparatus is wearable on a user skin and attached to the user skin using at least one of the following: adhesive material, deforming a wrap-around to a body part of the user, a suction cup and combinations thereof.

In another example embodiment, the user input device comprises at least one of the following: a microphone, a flexible touch screen and a sensor. The user output device may comprise at least one of the following: a flexible display, a flexible touch screen, a speaker, a light source, a vibrator and the transformable body. The flexible display may be integrated to the flexible touch screen or provided as a separate element. The light source may comprise at least one light emitting diode (LED), for example.

In still another example embodiment, the remote processing unit is a cloud processing unit or another local apparatus, such as laptop computer, mobile phone or personal digital assistant (PDA).

The transformable body may comprise at least one of the following substrates: dielectric elastomer, electroactive polymer, ionic polymer-metal composite, ionic gel, carbon nanotube, conductive polymer, ferroelectric polymer, polymer electret, electrostrictive polymer, relaxor ferroelectric polymer, electrostrictive graft-copolymer, liquid crystal elastomer, and mixtures thereof. The flexible interconnection may comprise at least one of the following materials: conductive polymer, nanotechnology material, metallic conductor in/on stretchable substrate, and combinations thereof.

In another example embodiment, at least one component of the apparatus is transparent. The transparency may be realized using at least one material of the following: tin-doped indium oxide, carbon nanotube, transparent conducting oxide, and combinations thereof.

In another example embodiment, the apparatus further comprises a positioning device configured to determine a position information of the apparatus and to use the position information in the determining of the user information. A sensor may also be included in the apparatus and configured to determine characteristics of a user, such as movement information of the user, body temperature of the user and pulse of the user. The user information may also be determined based on a gesture identified using the movement information of the user.

The wireless link may comprise at least one of the following: a cellular radio access, a non-cellular radio access and a peer-to-peer radio access.

In another example embodiment, the first configuration may be an on-skin wearing configuration in which the body of the apparatus has a first size and the second configuration being an operating configuration in which the body of the apparatus is transformed to a second size. The first size may be smaller in size than the second size. The transforming between the first and second configuration may be done by stretching the body of the apparatus.

In another example embodiment, the processor may not be needed at all in the apparatus. Driving of the user input and output devices may be done with simple logical circuits and the processing may be transferred to the remote processing unit.

According to a second example aspect of the invention there is provided a method comprising:
elastically transforming a stretchable body of an apparatus between a first configuration and a second configuration, the body comprising;
a user output device;
a communication interface configured to provide a wireless link for the apparatus;
a user input device configured to receive user input signal; and
a flexible interconnection between at least two components within the transformable body;
determining user information based on the user input signal;
transmitting at least part of the user information over the wireless link to a remote processing unit;
receiving feedback information from the remote processing unit; and
presenting the feedback information to the user utilizing the user output device.

According to a third example aspect of the invention there is provided a computer program embodied on a computer readable medium comprising computer executable program code which, when executed by at least one processor of an apparatus, causes the apparatus to perform:
determine a configuration of a transformable body configured to be elastically stretchable;
receive a user input signal;
determine user information based on the user input signal;
transmit at least part of the user information over the wireless link to a remote processing unit;

receive feedback information from the remote processing unit; and present the feedback information to the user.

According to a fourth example aspect of the invention there is provided a method comprising:

determining a configuration of a transformable body configured to be elastically stretchable, the body comprising;
 a user output device;
 a communication interface configured to provide a wireless link for the apparatus;
 a user input device configured to receive user input signal; and
 a flexible interconnection between at least two components within the transformable body;
determining user information based on the user input signal;
transmitting at least part of the user information over the wireless link to a remote processing unit;
receiving feedback information from the remote processing unit; and
presenting the feedback information to the user utilizing the user output device.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
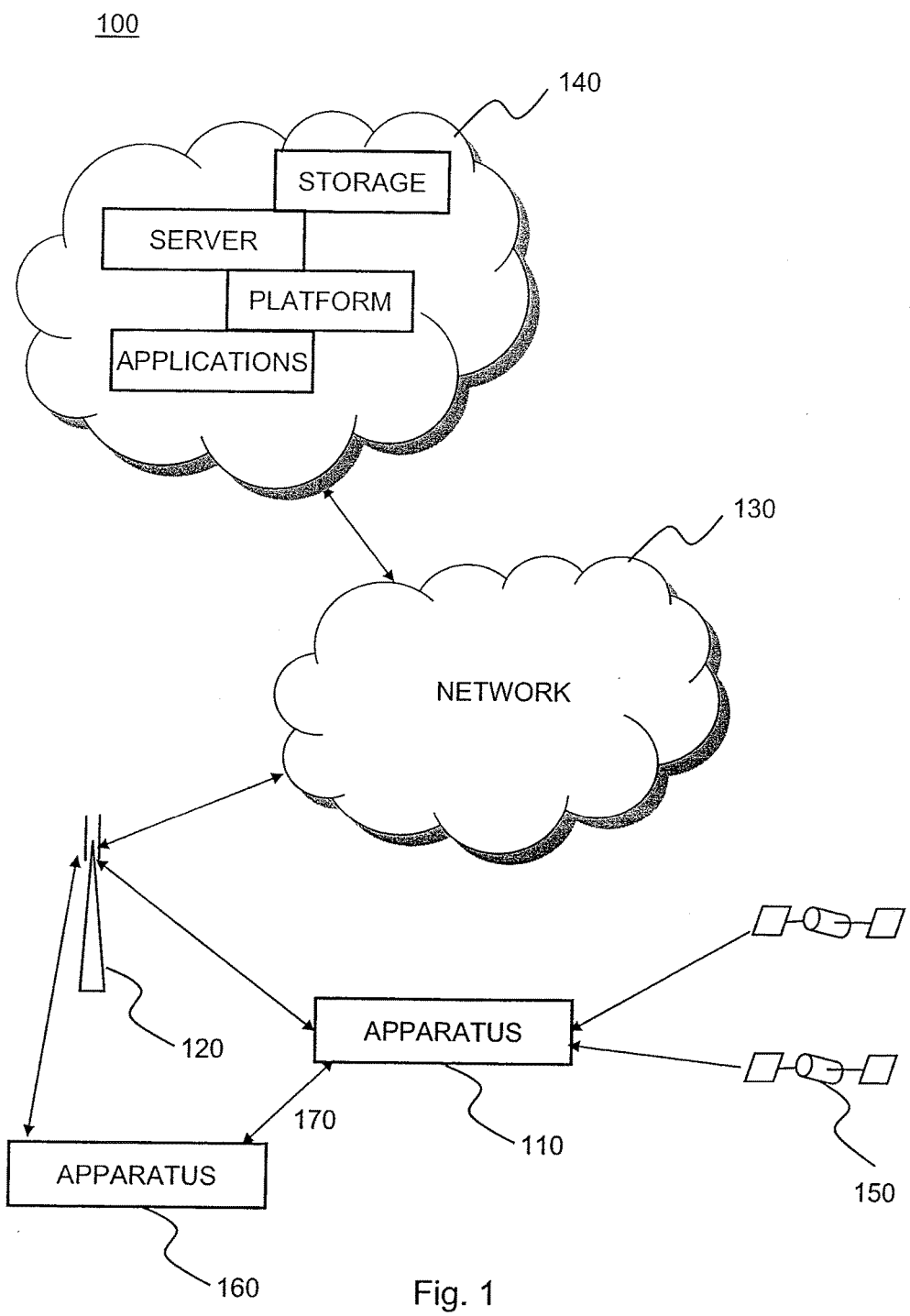
FIG. 1 shows some details of the system architecture.

FIG. 1 shows some details of the system architecture 100 in an example embodiment of the invention. An apparatus 110 may be connected to a network 130 via a wireless network operator 120. The network 130 may be internet or some limited network system, such as local area network, cellular operator network, ad-hoc network or such. The wireless network operator 120 may be a cellular operator, fixed broadband operator or mobile broadband operator, for example.

A cloud processing unit 140 is connected to the network 130. Cloud processing is internet-based computing, whereby shared resources, software, and information are provided to computers and other devices on demand, like in the electricity grid. Typical cloud computing providers deliver common online business applications that are accessed from another web service or software like a web browser, while the software and data are stored on servers. Customization and creation of a user-defined experience are typical characteristics of cloud computing. The system architecture of the software systems involved in the delivery of cloud computing, typically involves multiple cloud components communicating with each other over application programming interfaces, usually web services. Typical components of the cloud processing unit 140 comprise platform, applications, infrastructure, server and storage. A client may be needed in the apparatus 110 for the delivery of the cloud processing unit 140 services.

The global positioning system is implemented when the apparatus 110 specially equipped to receive global positioning system data begins scanning radio frequencies for global positioning system satellite 150 signals. Upon receiving a radio signal from a global positioning system satellite 150, the apparatus 110 can determine the precise location of that satellite 150 via one of different conventional methods. The apparatus 110 will continue scanning for signals until it has acquired at least four different satellite signals. Implementing geometrical triangulation, the apparatus 110 utilizes the four known positions to determine its own three-dimensional position relative to the satellites 150. An unlimited number of users can update the positioning and velocity data in real time on a continuous basis.

Although global positioning system enabled apparatuses 110 are often used to describe navigational devices, it will be appreciated that satellites 150 need not be used to determine a geographic position of a receiving unit since any receiving apparatus 110 capable of receiving the location from at least three transmitting locations can perform basic triangulation calculations to determine the relative position of the receiving apparatus with respect to the transmitting locations. For example, cellular towers or any customized transmitting radio frequency towers can be used instead of satellites 150. With such a configuration, any standard geometric triangulation algorithm can be used to determine the exact location of the receiving unit. In this way, personal hand held devices, cell phones, intelligent appliances, intelligent apparel, and others can be readily located geographically, if appropriately equipped to be a receiving unit.

The apparatus 110 may include one or more processors, controllers, or other computing devices and memory for storing information accessed and/or generated by the processors or other computing devices. The apparatus 110 is operable to receive navigational signals from the global positioning system satellites 150 to calculate a position of the portable tracking apparatus 110 as a function of the signals. The apparatus 110 is also operable to calculate a route to a desired location, provide instructions to navigate to the desired location, and to execute other functions described herein. The memory may store cartographic data and routing used by or generated by the apparatus 110. The memory may be integral with the location determining component, stand-alone memory, or a combination of both. The memory may include, for example, removable cards. The apparatus 110 may also route the navigational signals to the cloud processing unit 140 for calculation. The processed location information may be forwarded to the apparatus 110 when calculated. In addition, the navigation route information may be calculated in the cloud processing unit 140.

The apparatus 110 may be connected to other apparatuses 160 via a local connection 170 or over the wireless network operator 120. The local connection may comprise for example Bluetooth, infrared, radio frequency identification tag, or some other local connection.

Figure 2A:
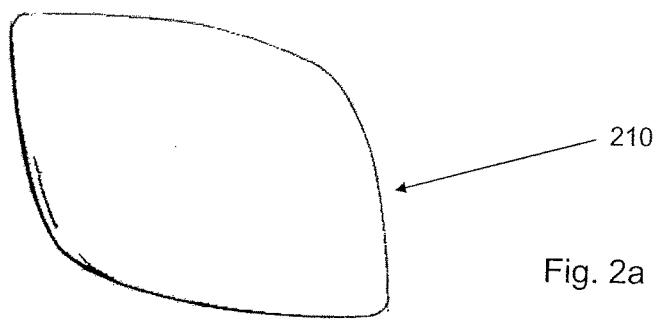
FIGS. 2a to 2c show schematic drawings of the apparatus in different operating configurations in accordance with an example embodiment of the invention.
Figure 2A:
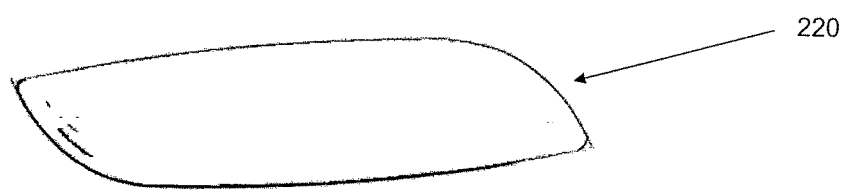
Figure 2B:
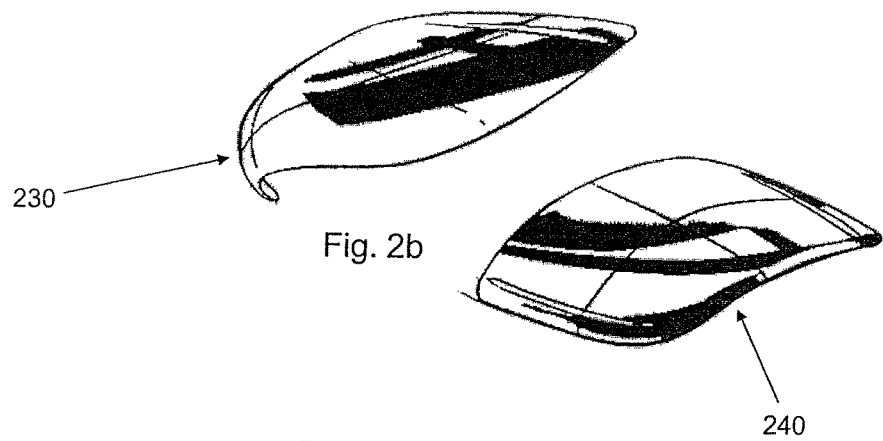
Figure 2C:
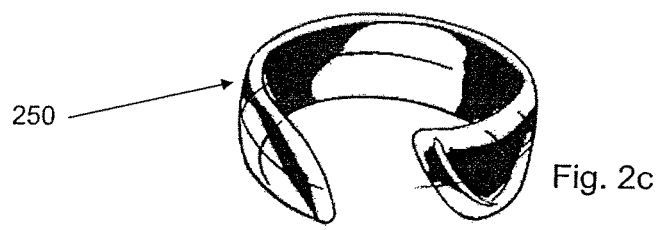

FIGS. 2a to 2c show schematic drawings of the apparatus in different operating positions in accordance with an example embodiment of the invention. The apparatus is constructed to be flexible and stretchable. Shape can be stretched from a wide hand held device to a long device, which can be wrapped around body parts. The apparatus may be made stretchable by using combination of highly elastic and plastic materials for mechanics, hardware components and interconnects. Some of the rigid components still included may be made thin and flexible or divided into small rigid islands and connected with stretchable interconnect (like sol-gel mixtures in chemistry).

In FIG. 2a, a transformable body of the apparatus is elastically stretched to a handheld operating configuration 210, in which a relatively large operating surface area is needed. Such operating configuration may be useful for example, when a user needs a large display size for viewing images or video. Another handheld operating configuration 220 shows the transformable body of the apparatus elastically stretched to another shape. Such operating configuration provides wider and lower mode compared to the previous operating configuration 210. The operating configuration 220 may be optimal for typing application, for example.

In accordance with an example embodiment of the invention, the apparatus 110 may be attached to user's palm, back of the hand, wrist, arm or any user body part. The apparatus 110 may be attached to the skin for example by adhesive surface constructed of nano-scale hair or medical adhesives. When the apparatus 110 is stretched longer than the body part's perimeter (for example a wrist), the apparatus 110 may stick to itself like self-adherent wrap or locked using buckles and locks typical to wrist watches and belts. Keeping the apparatus 110 attached to the body may also be made by maintaining the deformed shape, for example a semicircle on a wrist. The shape may be maintained by using braking and damping mechanisms or miniature servomotors. A further example embodiment is to use overlapping lamels and adjusting normal force between them, for example by mechanical or electrostatic means.

The apparatus 110 may be designed to be a second skin close to user's body and made breathable by matrix of miniature voids or pores. Due to the flexibility, the form of the apparatus 110 may follow body shapes. Being flexible and stretchable, the apparatus 110 may also be enabled to adjust to body movements. Thin and flat form may be achieved by avoiding component stack ups and using larger area instead. Using intelligent network activity algorithm and using effective power management enable a thin battery usage for the apparatus 110.

The form of the apparatus 110 follows the needed function and is adjustable for the main task. For sports activities like cycling the apparatus 110 may be worn around palm and back of the hand as shown in FIG. 2b. A palm operating mode 230 keeps the apparatus 110 visible and easy to operate with the other hand, by voice commands, by changing the tilting angle of the hand or by finger presses of the hand wearing the apparatus 110. When worn around palm and back of the hand and pressing palm against a surface (e.g. bicycle handle bar), the pressure and it's location against the handle may be used to control the apparatus 110, simply by slightly tilting the palm. The pressure sensing may be provided by the touch panel of the apparatus or with a separate force sensor. A backhand operating mode 240 provides easy accessibility for the apparatus 110.

In accordance with an example embodiment of the invention, a wrist operating mode 250 is provided. The apparatus 110 may be deformed and stretched to a circular shape around a wrist of the user, for example. The circular form of the operating mode 250 may be maintained utilizing the artificial muscle material as described earlier in this application.

Figure 3A:
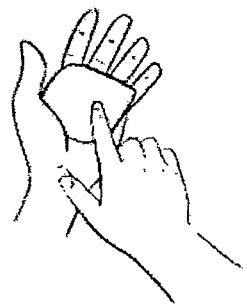
FIGS. 3a to 3c show schematic drawings of the apparatus in different wearing configurations on user's skin in accordance with an example embodiment of the invention.
Figure 3B:
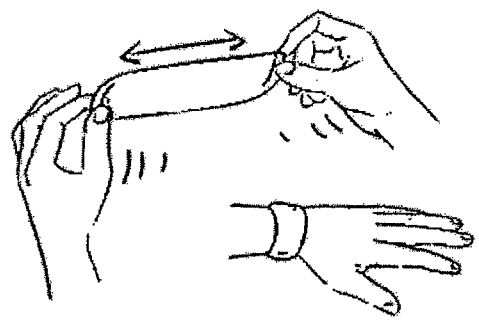
Figure 3C:
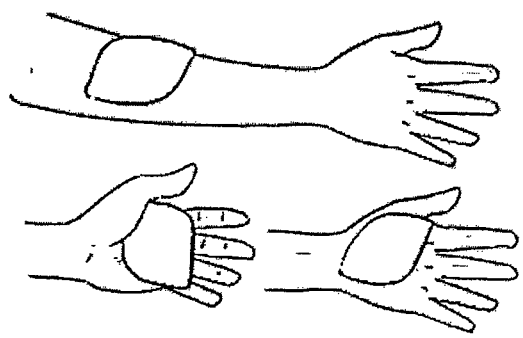

FIGS. 3a to 3c show schematic drawings of the apparatus 110 in different wearing configurations on user's skin in accordance with an example embodiment of the invention. FIG. 3a shows an embodiment in which a user may attach the apparatus 110 to a palm and deform the body of the apparatus against the skin of the palm. The apparatus 110 is well protected in the palm of the user and is easily usable with other hand or with the fingers of the hand wearing the apparatus 110.

FIG. 3b shows a stretching of the apparatus 110 from a hand operating mode 210 to a wrist mode 250.

FIG. 3c shows different on-skin wearing possibilities for the apparatus 110. The transformable body may be deformed on the skin of the user on the arm, back of the hand or the palm of the user.

Figure 4:
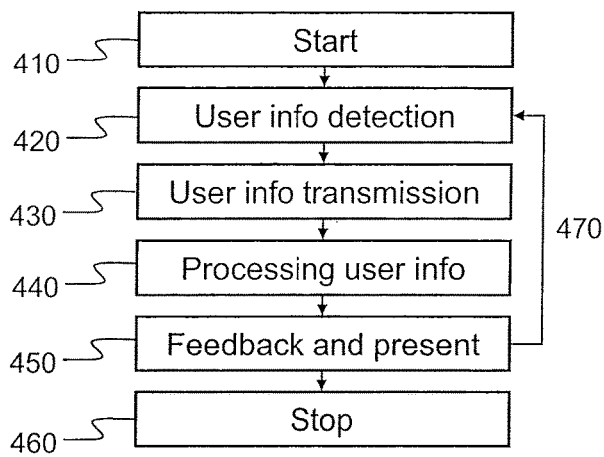
FIG. 4 shows different phases of an apparatus operation in accordance with an example embodiment of the invention.

FIG. 4 shows different phases of an apparatus operation in accordance with an example embodiment of the invention. The apparatus 110 may be attached already on a palm or a wrist and turned already on. A start phase 410 may be triggered based on user activity. Such an activity may be, for example, a movement detected by a motion sensor of the apparatus 110, touch or press recognized by a force sensor or a touch screen or voice detected by a microphone and audio processing of the apparatus 110. Before the start phase 410 the apparatus 110 may be maintained in low-power consuming mode or stand-by for power saving.

A user information detection phase 420 is an active state in which user related information is detected. The apparatus 110 may act as a personal advisor. Typically, the information may be non-intrusively visible only on the screen. However, during a performance like cycling, shopping or common navigation, the advices may also be audible or haptic. The apparatus 110 may collect user related information that may be transmitted for remote processing unit 140 for further processing and storage. A user profile may be generated comprising at least part of the collected user related information.

User information is transmitted to the remote processing unit 140 in phase 430. Transmission may be carried out whenever new data is being collected or periodically for power saving purposes.

The remote processing unit 140, 160 processes the received user information. Based on the processing, a feedback information is generated to the user of the apparatus 110. The remote processing unit 140, 160 may comprise a cloud processing unit 140 or another apparatus 160, for example. The another apparatus 160 may be another mobile apparatus like mobile phone or personal digital assistant (PDA), a laptop computer, a desktop computer or such.

In an example embodiment of the invention, the apparatus 110 may monitor use context in the detection phase 420 by picking the words "go cycling" or "bicycle". The apparatus 110 may also recognize the vicinity of a radio frequency tag in the user's, gym's or renting company's bicycle. Similar kind of recognition may be done based on user's location, accompanying persons by their phone identification (bluetooth, wireless lan or radio frequency identification). All this collected information may be sent to the remote processing unit 140, 160 as user information in the user information transmission phase 430. The apparatus 110 may also transmit only certain parts of the user input information.

The transmission 430 of the user information may be done by cellular radio interface like wideband code division multiple access (WCDMA) or global system for mobile communications (GSM). Another possibility is to use non-cellular radio interface like bluetooth, wireless local area network (WLAN) or worldwide interoperability for microwave access (WIMAX). Still another possibility is to use peer-to-peer wired interface like universal serial bus (USB) or high definition multimedia interface (HDMI).

The user information is processed at the remote processing unit 140, 160 in phase 440. The user activities may be predicted based on the recognized persons that are used to get together for example for work, family activities or certain hobby. The remote processing unit 140, 160 may calculate the probability of the user's next actions based on the data collected by the wearable apparatus 110 and provide feedback information 450 to the apparatus 110. Such feedback 450 may comprise, for example, information for showing top five alternative applications directly on the idle screen of the apparatus 110. Cycling is among one of the alternatives. The proposed application icons may float on the screen, acting also like a screen saver. The screen may be turned off most of the day to save energy. When the user's gestures indicate the intention to use the apparatus 110, the floating icons may first appear as dimmed. After a user command, for example, the floating icons may activate full brightness. The feedback information 450 received by the apparatus 110 may comprise information adapted to be presented by the user interface of the apparatus 110 without heavy processing. The feedback information 450 may comprise links to further information downloadable from the remote processing unit 140, 160 or from the internet, for example. The processing level of the feedback information 450 may vary depending on the processing capability of the apparatus 110 and/or the user settings.

In an example embodiment of the invention, after the user has confirmed the intention to go cycling, the apparatus 110 proposes alternative routes that have been processed by remote processing unit 140, 160 and provided as the feedback information 450 to the apparatus 110. Further advice may also be provided, such as helmet usage, water bottle or condition checking points of the bicycle. The advisor's level of details may be adjusted based on user's habits. If the user keeps ignoring the advices, the list of advises may be shortened. If a long time has passed since the previous cycling, the list may again be longer.

Whenever the user acts based on the received feedback 450, new user input information is detected 470. Based on the new user input information 470, updated user information is sent 430 to the remote processing unit 140, 160 for processing 440. Such a loop may be active all the time the apparatus 110 is turned on and active.

In an example embodiment of the invention, after selecting the cycling application presented to the user based on the feedback information 450, the cyclist chooses a recorded route. The apparatus 110 may show a number of suggestions based on the current user location and cycling history. The suggestions may be based on cycling type (sports/leisure/mixed), typical route length, and desire for same route vs. constantly seeking for alternative routes or places of interest on the route. Further criteria may comprise an amount of calories burned or a contour preference, for example for flat/hilly/progressive/declining route. In addition, there may be an option to get more suggestions, to record a new (previously unrecorded) route, to select manually from a list (searched by a keyword) or to use the application only like the current navigators, by setting waypoints. During the cycling activity, the remote processing unit 140, 160 may generate coaching instructions as feedback information 450 to encourage the user for better performance, for example.

In an example embodiment of the invention, a virtual companion for the user may be created. The remote processing unit 140, 160 processes the needed data and transmits the data to the apparatus 110 as feedback information 450. The cycling user may chase the virtual companion or follow a virtual tour guide. The user may hear the sound of the companion from the speaker or earpiece of the apparatus 110 constantly and the user may also look at the display when needed. In addition, the accompanying real companions' voices may be heard through the apparatus 110, even when from a distance, utilizing an ad-hoc conference call between virtual and real persons over cellular, voice over ip, bluetooth or other wireless communication. During cycling the apparatus 110 may also monitor sensory data 420 and in case of suspected problems in bodily functions, for example dehydration or need for energy (based on processing phase 440), advice may be generated as feedback information 450. Processing may utilize ambient and body temperature, skin humidity, user body activity, drinking/eating history (based on sounds or hand gestures, calories of meals picked from restaurant's wireless menu or based on the information sent by a vending machine), pulse or duration of the activity. Instructions may comprise advice to drink a certain amount liquid, for example. The apparatus 110 may also monitor the amount of liquid and proposes alternatives to refill at public water taps, toilets, cafes, or simply to have a pause in the cycling. The same logic may apply also for eating and energy refill.

The advice presented by the apparatus 110 may also improve user's self-awareness and give a probable reason for the user feelings (tired, sad, happy). The apparatus 110 may sense the mood from user's activities, body monitoring and voice. Such user information detection 420 may comprise for example sleeping times, eating habits, or exercise amounts. The detected user information of the combination of parameters and their effect on the user may be a kind of "human black box", which the remote processing unit 140, 160 prediction engine utilizes and the user can browse or publish selected items in social media, for example. The apparatus 110 may also detect 420 the speech audio and transmit 430 the detected speech information to the remote processing unit 140, 160. The remote processing unit 140, 160 may filter and process the speech information using for example speech recognition and improvement algorithms before storing the data. Whenever the user may need to remember some earlier discussions, the stored discussions may be fetched from the remote processing unit 140, 160 as feedback information 450 presented to the user. Such an extension to "human black box" may improve user security as well.

For multimodal navigation, the apparatus 110 may provide haptic feedback on hand in addition to audiovisual information. The apparatus 110 may also warn on vehicles coming out of user's vision. Warning information may be based on a camera signal, detected sound of a car or radio (for example bluetooth/WLAN) detection of approaching another apparatus and the apparatus 110 may also keep track on accompanying person's locations. The reference performance such as a virtual competitor may be presented as feedback information 450 with audio (for example headphones), video (for example display, pico-projector, data glasses or remote display), haptic (for example vibrator), or as combinations of these.

The apparatus 110 may provide a human extension connecting user's body and senses to remote processing unit 140, 160 (for example cloud processing unit). A wearable on-skin apparatus 110 may provide a gateway between a physical body and surroundings. Surroundings may also be virtual. The apparatus 110 may interplay with user senses and emotions by reconfigurably and transformably adapting with usage context. In an example embodiment of the invention, the apparatus 110 may be covered by a flexible display material that may be used for decoration purposes. Decorative color or pattern displayed on the apparatus 110 may be changed based on the detected user information 420 that is being sent to and processed 450 by the remote processing unit 140, 160. Detected user information 420 may, for example, comprise information on the clothes that user is wearing based on camera signal of the apparatus 110 or based on user settings.

In a phase 460, the apparatus 110 may be turned off and user information detection is de-activated. The stop phase 460 of the user info detection may also be triggered by switching off the detection function only and keep the other part of the apparatus 110 still active.

Figure 5:
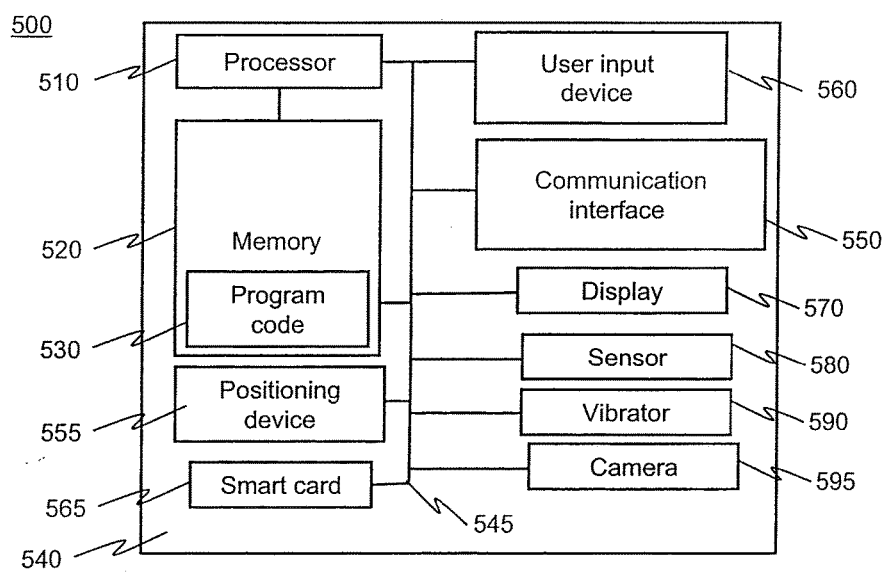
FIG. 5 presents an example block diagram of an apparatus in which various example embodiments of the invention may be applied.

FIG. 5 presents an example block diagram of an apparatus 500 in which various embodiments of the invention may be applied. This may be a transformable apparatus with stretchable body that may function as user equipment (UE), a user device or apparatus, such as a mobile terminal or other communication device, for example.

The general structure of the apparatus 500 comprises a communication interface module 550, a processor 510 coupled to the communication interface module 550, and a memory 520 coupled to the processor 510. The apparatus further comprises software 530 stored in the memory 520 and operable to be loaded into and executed in the processor 510. The software 530 may comprise one or more software modules and can be in the form of a computer program product. The apparatus 500 further comprises a user input device 560 coupled to the processor 510 and a display 570.

In accordance with an example embodiment of the invention, the apparatus 500 may further comprise a positioning device 555 such as global positioning system (GPS) receiver. The apparatus may further comprise a display 570 for displaying information to the user. The display 570 may be flexible and either provided as a separate component or integrated to a touch screen included in the user input device 560. The apparatus may further comprise a sensor 580, a vibrator 590 and a camera 595.

In accordance with an example embodiment of the invention, a smart card or a universal integrated circuit card (UICC) 565 may be included in the apparatus 500 for authentication and billing purposes, for example. The universal integrated circuit card (UICC) 565 ensures the integrity and security of certain personal data. The universal integrated circuit card (UICC) 565 may contain its unique serial number, internationally unique number of the mobile user (IMSI), security authentication and ciphering information, temporary information related to the local network, a list of the services the user has access to and passwords (PIN for usual use and PUK for unlocking). The universal integrated circuit card (UICC) 565 may further comprise several applications, making it possible for the same smart card to give access to different networks, and provide storage of a phone book and other applications. The system may utilize an embedded security module for the key storage and processing. The apparatus 500 may further include separate cards for communication interface 550 purposes and electronic billing purposes.

In accordance with an example embodiment of the invention, the transformable body 540 of the apparatus 500 may be generated using artificial muscle material. Such material may comprise bistable dielectric polymer or electroactive polymer, for example. Dielectric elastomers (DE) behave as compliant capacitors, expanding in area and shrinking in thickness when a voltage is applied. Polymers present an alternative. They possess inherent compliance, are lightweight, and are generally low cost. Electroactive polymers (EAP) are an emerging type of actuator technology wherein a lightweight polymer responds to an electric field by generating mechanical motion. Their ability to mimic the properties of natural muscle has garnered them the moniker artificial muscle, though the term electroactive polymer artificial muscle (EPAM) is more appropriate and descriptive. Electroactive polymers (EAP) can be broadly divided into two categories based on their method of actuation: ionic and field-activated. Further subdivision based on their actuation mechanism and the type of material involved is possible. Ionic polymer-metal composites, ionic gels, carbon nanotubes (CNT), and conductive polymers (CP) fall under the ionic classification. Ferroelectric polymers, polymer electrets, electrostrictive polymers, and dielectric elastomers (DE) fall under the electronic classification. The transformable body 540 of the apparatus 500 may comprise at least one substrate of the following: dielectric elastomer, electroactive polymer, ionic polymer-metal composite, ionic gel, carbon nanotube, conductive polymer, ferroelectric polymer, polymer electret, electrostrictive polymer, relaxor ferroelectric polymer, electrostrictive graft-copolymer, liquid crystal elastomer, and mixtures thereof.

In accordance with an example embodiment of the invention, a flexible interconnection 545 may comprise at least one material of the following: conductive polymer, nanotechnology material, metallic conductor in/on stretchable substrate, and combinations thereof. The flexible interconnection may also comprise a flexible printed circuit board (pcb). The flexible printed circuit board (pcb) may be fabricated by combining stretchable conductive materials, geometries that reduce the needed deformation of material and islands of rigid components, for example.

A flexible touch screen may be used for both the display 570 and the user input device 560. Stretchability can be made with stretchable conductive materials on stretchable substrates like thermoplastic elastomers. The display 570 may also comprise a flexible high-resolution color displays manufactured by connecting a rigid transistor with stretchable interconnects, for example.

The communication interface module 550 implements at least part of the user data radio discussed in connection with various embodiments of the invention. The communication interface module 550 may be, e.g., a radio interface module, such as a WLAN, Bluetooth, GSM/GPRS, CDMA, WCDMA, or LTE (Long Term Evolution) radio module. The communication interface module 550 may be integrated into the apparatus 500 or into an adapter, card or the like that may be inserted into a suitable slot or port of the apparatus 500. The communication interface module 550 may support one radio interface technology or a plurality of technologies. FIG. 5 shows one communication interface module 550, but the apparatus 500 may comprise a plurality of communication interface modules 550.

The processor 510 may be, e.g., a central processing unit (CPU), a microprocessor, a digital signal processor (DSP), a graphics processing unit, or the like. FIG. 5 shows one processor 510, but the apparatus 500 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 500 may comprise a plurality of memories. The memory 520 may be constructed as a part of the apparatus 500 or it may be inserted into a slot, port, or the like of the apparatus 500 by a user. The memory 520 may serve the sole purpose of storing data, or it may be constructed as a part of an apparatus serving other purposes, such as processing data.

The user input device 560 may comprise circuitry for receiving input from a user of the apparatus 500, e.g., via a flexible keyboard, a flexible touch screen, speech recognition circuitry, a microphone, or an accessory device, such as a headset.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available. Stretch ability for the battery may be achieved by packing electrolyte fluids in a stretchable housing.

Figure 6:
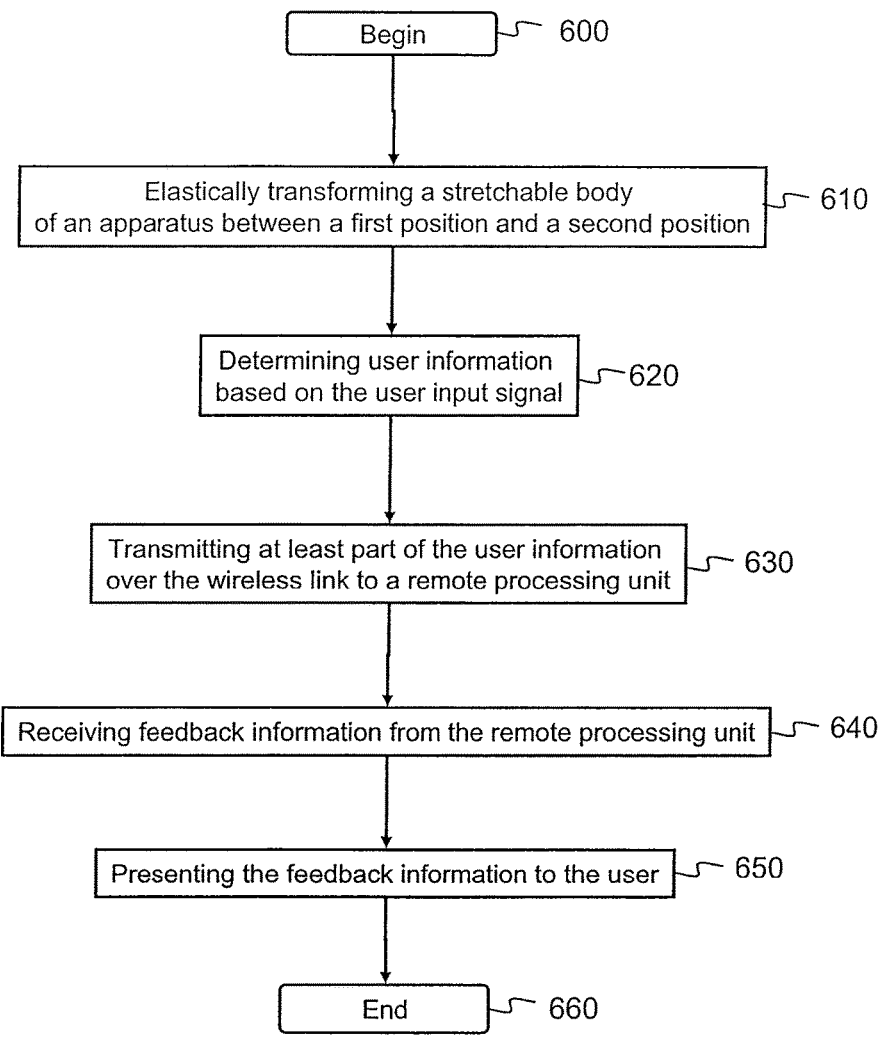
FIG. 6 shows a flow diagram showing operations in an apparatus in accordance with an example embodiment of the invention.

FIG. 6 shows a flow diagram showing operations in an apparatus in accordance with an example embodiment of the invention. In step 600, the operation is started. In step 610, a stretchable body of an apparatus is elastically transformed between a first configuration and a second configuration. In step 620, user information is determined based on a user signal received by a user input device of the apparatus. At least part of the user information is transmitted over a wireless link to a remote processing unit in step 630. Feedback information is received by the apparatus from the remote processing unit in step 640. In step 650, the feedback information is presented to the user. In step 660, the operation is ended.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a transformable shaped body configured to be elastically stretchable by a user between a visual display device and a user-wearable input device, the transformable shaped body having at least a first-operating-configuration having a relatively large operating surface area of a first width and height, the first configuration being the visual display device comprising a flexible display, and a second-operating configuration-having a second width larger than the first width and a second height smaller than the first height, the second configuration being the user-wearable touch input device configured to be worn by the user;
a power saving circuit within the transformable shaped body, including audio processing configured to trigger a start phase to transition from a low-power consuming mode for power saving of components within the transformable shaped body, in response to a detected voice command by the audio processing;
the transformable shaped body elastically stretched by the user in the second operating configuration forming the user-wearable touch input device within the transformable shaped body, configured to receive user touch input signals indicating an update of navigation information, after the start phase has been triggered by the voice command;
a communication interface within the transformable shaped body, configured to provide a wireless link for the apparatus to receive source location indications from one or more transmitting locations and configured to determine a geographic position of the transformable shaped body with respect to the transmitting locations;
the transformable shaped body elastically stretched by the user in the first operating configuration forming the visual display device within the transformable shaped body, configured to display navigation information based on a determined geographic position of the transformable shaped body, after the start phase has been triggered by the voice command; and
a flexible interconnection within the transformable shaped body, between at least two components within the transformable shaped body, comprising stretchable interconnects to the flexible display;
wherein the flexible interconnection is configured to interconnect, within the transformable shaped body, at least one of the flexible display, the user-wearable input device, or the communication interface with at least one processor.

2. The apparatus of claim 1, wherein the apparatus is wearable on a user skin.

3. The apparatus of claim 2, wherein the apparatus is attached to the user skin using at least one of the following:

adhesive material, deforming a wrap-around to a body part of the user and a suction cup.

4. The apparatus of claim 1, wherein the user input device comprises at least one of the following: a microphone, a flexible touch screen and a sensor.

5. The apparatus of claim 1, wherein the user output device comprises at least one of the following: a flexible display, a flexible touch screen, a speaker, a light source, a vibrator and the transformable body.

6. The apparatus of claim 1, wherein the remote processing unit is a cloud processing unit.

7. The apparatus of claim 1, wherein the remote processing unit is another apparatus.

8. The apparatus of claim 1, wherein the transformable body comprises at least one of the following substrates: dielectric elastomer, electroactive polymer, ionic polymer-metal composite, ionic gel, carbon nanotube, conductive polymer, ferroelectric polymer, polymer electret, electrostrictive polymer, relaxor ferroelectric polymer, electrostrictive graft-copolymer, liquid crystal elastomer, and mixtures thereof.

9. The apparatus of claim 1, wherein the flexible interconnection comprises at least one of the following materials: conductive polymer, nanotechnology material, metallic conductor in/on stretchable substrate, and combinations thereof.

10. The apparatus of claim 1, wherein at least one component of the apparatus being transparent.

11. The apparatus of claim 10, wherein the transparency is realized using at least one material of the following: tin-doped indium oxide, carbon nanotube, transparent conducting oxide, and combinations thereof.

12. The apparatus of claim 1, further comprising a positioning device configured to determine a position information of the apparatus, wherein the at least one memory and the computer program code configured to, with the at least one processor, cause the apparatus to:
use the position information in the determining of the user information.

13. The apparatus of claim 1, further comprising
a sensor configured to determine characteristics of a user.

14. The apparatus of claim 13, wherein the sensor configured to determine the characteristics of the user comprises at least one of the following: a motion sensor, user body temperature meter and pulse meter.

15. The apparatus of claim 13, wherein the characteristics of the user comprise at least one of the following: movement information of the user, body temperature of the user and pulse of the user.

16. The apparatus of claim 15, wherein the at least one memory and the computer program code configured to, with the at least one processor, cause the apparatus to:
determine the user information based on a gesture identified using the movement information of the user.

17. The apparatus of claim 1, wherein the wireless link comprises at least one of the following: a cellular radio access, a non-cellular radio access and a peer-to-peer radio access.

18. The apparatus of claim 1, wherein the first configuration being an on-skin wearing configuration in which the body of the apparatus having a first size, and the second configuration being an operating configuration in which the body of the apparatus being transformed to a second size.

19. A method comprising:
elastically transforming a shape of a transformable shaped body configured to be elastically stretchable by a user between a visual display device and a user-wearable touch input device, the transformable shaped body having at least a first-operating-configuration-having a relatively large operating surface area of a first width and height, the first configuration being the visual display device comprising a flexible display, and a second-operating configuration-having a second width larger than the first width and a second height smaller than the first height, the second configuration being the user-wearable touch input device configured to be worn by the user, the transformable shaped body including a flexible interconnection within the transformable shaped body, between at least two components within the transformable shaped body, comprising stretchable interconnects to the flexible display;
triggering a start phase to transition from a low-power consuming mode for power saving of components within the transformable shaped body, in response to a detected voice command;
determining user update of navigation information based on a user touch input signal to the transformable shaped body elastically stretched by the user in the second operating configuration forming the user-wearable touch input device within the transformable body, after the start phase has been triggered by the voice command;
receiving a source location indication from one or more transmitting locations and determining a geographic position of the transformable shaped body with respect to the transmitting locations; and
presenting navigation information to the user utilizing the transformable shaped body elastically stretched by the user in the first operating configuration forming the flexible display, after the start phase has been triggered by the voice command;
wherein the flexible interconnection is configured to interconnect, within the transformable shaped body, the flexible display and the user-wearable input device.

20. A computer program embodied on a computer readable non-transitory medium, comprising computer executable program code which, when executed by at least one processor of an apparatus, causes the apparatus to:
determine a configuration of a transformable shaped body configured to be elastically stretchable by a user between a visual display device and a user-wearable touch input device, the transformable shaped body having at least a first-operating-configuration-having a relatively large operating surface area of a first width and height, the first configuration being the visual display device comprising a flexible display, and a second-operating configuration-having a second width larger than the first width and a second height smaller than the first height, the second configuration being the user-wearable touch input device configured to be worn by the user;
trigger a start phase to transition from a low-power consuming mode for power saving of components within the transformable shaped body, in response to a detected voice command;
receive a user touch input signal indicating an update of navigation information, at the transformable shaped body elastically stretched by the user in the second operating configuration forming the user-wearable touch input device coupled to a flexible keyboard within the transformable shaped body, after the start phase has been triggered by the voice command;
receive source location indications from one or more transmitting locations and determine a geographic position of the transformable shaped body with respect to the transmitting locations via a communication interface within the transformable shaped body, over a wireless link to a remote processing unit; and present navigation information to the user with the transformable shaped body elastically stretched by the user in the first operating configuration forming the flexible display within the transformable shaped body, based on the determined geographic position of the transformable shaped body, after the start phase has been triggered by the voice command;

wherein the transformable shaped body includes a flexible interconnection within the transformable shaped body, configured to interconnect at least one of stretchable interconnects to the flexible display, the user-wearable touch input device, or the communication interface within the transformable body, with at least one processor within the transformable shaped body.

21. The apparatus of claim 1, wherein the user output device presents haptic feedback relating to navigation.

22. The apparatus of claim 21 wherein the presented feedback information provides instructions for navigating to a desired location.

23. The apparatus of claim 22 wherein at least one memory and computer program code are configured to, with at least one processor, cause the apparatus to calculate a route to a desired location for presentation to the user.

24. The apparatus of claim 22 wherein the presented feedback information includes alternative routes of travel.

25. The apparatus of claim 21 wherein the haptic feedback is provided on a hand of the user.

26. The apparatus of claim 21 wherein the presented feedback information further comprises at least one of audio and visual information.

27. The apparatus of claim 21 wherein the apparatus further comprises a global positioning system receiver for determining a position of the apparatus.

28. The method of claim 19, wherein the user output device presents haptic feedback relating to navigation.

29. The method of claim 28 wherein the presented feedback information provides instructions for navigating to a desired location.

30. The method of claim 29 further comprising calculating a route to a desired location for presentation to the user.

31. The method of claim 29 wherein the presented feedback information includes alternative routes of travel.

32. The method of claim 28 wherein the haptic feedback is provided on a hand of the user.

33. The method of claim 28 wherein the presented feedback information further comprises at least one of audio and visual information.

34. The method of claim 28 wherein the apparatus comprises a global positioning system receiver for determining a position of the apparatus.

35. The computer program of claim 20, wherein the presented feedback information comprises haptic feedback relating to navigation.

36. The computer program of claim 35 wherein the presented feedback information provides instructions for navigating to a desired location.

37. The computer program of claim 36 wherein the apparatus calculates a route to a desired location for presentation to the user.

38. The computer program of claim 36 wherein the presented feedback information includes alternative routes of travel.

39. The computer program of claim 35 wherein the haptic feedback is provided on a hand of the user.

40. The computer program of claim 35 wherein the presented feedback information further comprises at least one of audio and visual information.

41. The computer program of claim 35 wherein the apparatus comprises a global positioning system receiver for determining a position of the apparatus.

* * * * *